Dec. 29, 1925.
1,567,324
A. E. JURS
HOSE COUPLING
Filed July 24, 1923
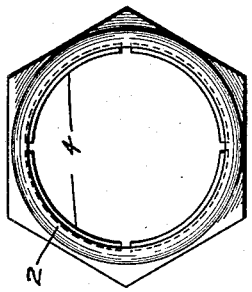
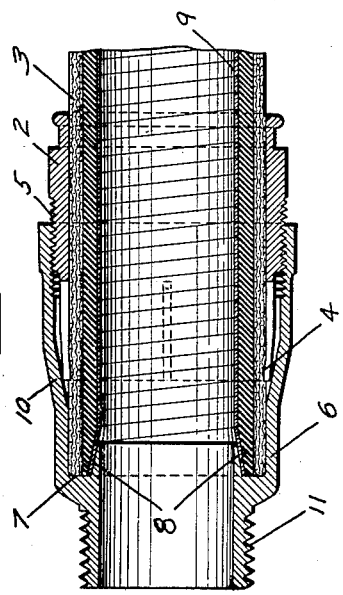
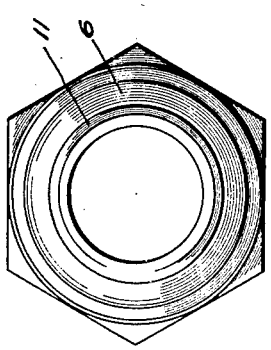
WITNESS
INVENTOR.
ALBERT E. JURS
BY
his ATTORNEYS.

Patented Dec. 29, 1925.

1,567,324

UNITED STATES PATENT OFFICE.

ALBERT E. JURS, OF OAKLAND, CALIFORNIA, ASSIGNOR TO THE THREADED PRODUCTS COMPANY, A COPARTNERSHIP CONSISTING OF ALBERT E. JURS AND REGINALD C. SHAND, BOTH OF OAKLAND, CALIFORNIA.

HOSE COUPLING.

Application filed July 24, 1923. Serial No. 653,492.

*To all whom it may concern:*

Be it known that I, ALBERT E. JURS, a citizen of the United States, and a resident of Oakland, county of Alameda, and State of California, have invented a certain new and useful Hose Coupling, of which the following is a specification.

The invention relates to hose couplings and particularly to a coupling for attachment to the end of a metal lined or otherwise internally reinforced hose.

An object of the invention is to provide a hose coupling that may be readily and tightly attached to the end of a hose.

Another object of the invention is to provide a hose coupling which grips the end of the hose with increasing pressure, as the coupling is assembled on the hose.

A further object of the invention is to provide a hose coupling which makes a tight electrical contact with the metal lining of the hose, rendering the hose non-static.

A further object of the invention is to provide a hose coupling which can be readily removed from and assembled on the end of a hose.

The invention possesses other advantageous features, some of which with the foregoing will be set forth in the following description, where I shall outline in full, that form of my invention which I have selected for illustration, in the drawings accompanying and forming part of the present specification. It is to be understood that I do not limit myself to the showing made by said drawings and description, as I may adopt variations of the preferred form of the invention, within the scope of the amended claims.

Referring to said drawings:

Figure 1 is a longitudinal section of the coupling of my invention assembled on a hose.

Figure 2 is an end view of the clamp socket member of the coupling.

Figure 3 is an end view of the spring sleeve member of the coupling.

The coupling of my invention comprises a sleeve having spring fingers formed thereon, which, when the sleeve is placed on the hose, are resiliently pressed against the outer covering of the hose, in combination with a clamp socket adapted to receive the end of the hose and to engage the spring fingers, whereby a movement of the clamp socket to assemble the coupling, further presses the spring fingers into the outer covering of the hose, firmly and tightly clamping the sleeve to the hose.

The cylindrical sleeve 2, which is adapted to slip over the end of the hose 3, is slotted longitudinally at one end to form a plurality of fingers 4. These fingers are inclined inwardly, so that the internal diameter of the cylinder enclosed by the spring fingers at their ends is slightly smaller than the external diameter of the hose, so that as the sleeve is slipped over the end of the hose, these fingers press against and imbed themselves into the outer surface of the hose. The fingers are sufficiently thin so that they are resilient, permitting the sleeve to be readily placed on the hose. The outer surface of the spring fingers may be tapered as shown to permit a more easily sliding contact on the inner surface of the socket bore. The other end of the sleeve is formed so that a wrench may be applied to it, to hold it in fixed position. Intermediate its ends, the sleeve is provided with an external thread 5, which is adapted to be engaged by the internally threaded end of the tubular clamp socket 6, the exterior portion of this end of the socket being formed to receive a wrench so that the socket may be screwed over the sleeve.

Formed in the other end of the clamp socket 6, is an annular tapered grove 7 adapted to receive the end of the hose, which has preferably been previously spread by suitable means so that the end of the hose will slip into the groove. The lip or ring 8 forming the inner wall of the groove has an internal diameter of approximately the same magnitude as the internal diameter of the hose and the metal lining 9 of the hose is expanded to engage the outer surface of the ring 8. The bore of the clamp socket 6 intermediate the two ends is tapered, thus forming an inclined wall 10, which engages the externally tapered ends of the spring fingers 4, so that as the clamp socket is screwed onto the sleeve, the fingers are pressed more tightly into the hose. At the same time, the end of the hose is forced into the annular tapered groove 7, forming a tight joint at that place. When the end of the hose is seated within the bottom of the groove, the adjacent bore of the socket becomes continuous with the internal diameter of the hose and the contact with the metal lining thereof renders the hose non-static. The end of the clamp socket may be formed in any way desired, the coupling shown in Figure 1 being provided with a threaded male end 11.

I claim:

1. A coupling for attachment to a hose comprising a sleeve having spring fingers thereon engaging said hose, whereby a pressure is maintained thereon, and a clamp member having a groove at one end adapted to receive the end of said hose and at the other end to engage said sleeve and having a tapered bore intermediate said ends engaging said spring fingers, whereby a movement of said clamp member to assemble said coupling, forces the spring fingers into the hose and forces the end of the hose into the groove.

2. A coupling for attachment to a hose comprising a sleeve having spring fingers resiliently pressing against the outer covering of said hose, and a clamp socket having an annular tapered groove at one end, adapted to receive the end of said hose and adapted at the other end to engage said sleeve and having a tapered bore intermediate said ends engaging said spring fingers, whereby a movement of said clamp member to assemble the coupling, forces the spring fingers into the hose and binds the end thereof.

3. A coupling for attachment to a metallic lined hose having a fabric cover and a compressible resilient filler comprising a threaded sleeve having inwardly inclined spring fingers resiliently pressing against the fabric covering of said hose, and a clamp socket having an annular tapered groove at one end, the inner wall of which is substantially continuous with the metal lining of the hose and threaded at the opposite end to engage the threaded portion of said sleeve and having a tapered bore intermediate said ends for engagement with said spring fingers whereby a movement of said clamp member to assemble the coupling forces the ends of the spring fingers into the hose and binds the end thereof.

4. A coupling for attachment to a metal lined hose comprising a sleeve, a plurality of inwardly inclined flexible fingers on said sleeve adapted to press against the surface of the hose, a clamp socket, an annular lip in said socket of substantially the same bore as the hose and forming, with the wall of the socket, an annular tapered seat into which the end of the hose extends, thus rendering the hose non-static, the wall of the socket being tapered and being adapted to engage the ends of the fingers, whereby a movement of the clamp socket to assemble the coupling, forces the fingers further into the hose and forces the end of the hose more tightly into the annular tapered seat.

5. A coupling for attachment to a hose comprising a clamp socket having a tapered bore into which the hose extends, a lip in said socket forming an annular groove with the wall of the socket, a hose member comprising a yielding metallic lining and compressible exterior parts inserted in the socket with the opening through the hose in substantial alinement with the aperture in the socket, a sleeve surrounding the hose and entering the socket, the entering end of the sleeve being contractible on engaging the tapered surface of the socket, an interengaging means adjacent the outer end portion of the socket, engaging the sleeve, the length of the interengaging means and sleeve and the angularity of the tapered bore being such that as the sleeve is forced into the socket, the exterior parts of the hose are directly engaged by the forward ends of the sleeve and forced inward against the yielding metal lining and forward into the annular groove in the socket.

In testimony whereof I have hereunto set my hand.

ALBERT E. JURS.